United States Patent
Guha et al.

(10) Patent No.: US 12,519,549 B2
(45) Date of Patent: Jan. 6, 2026

(54) PROCESSING SIGNALS USING ENTANGLEMENT-ASSISTED COMMUNICATION

(71) Applicant: Arizona Board of Regents on Behalf of the University of Arizona, Tucson, AZ (US)

(72) Inventors: Saikat Guha, Tucson, AZ (US); Ali Cox, Tucson, AZ (US); Quntao Zhuang, Tucson, AZ (US); Christos Gagatsos, Tucson, AZ (US); Boulat Bash, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 253 days.

(21) Appl. No.: 18/289,884

(22) PCT Filed: May 19, 2022

(86) PCT No.: PCT/US2022/029951
§ 371 (c)(1),
(2) Date: Nov. 7, 2023

(87) PCT Pub. No.: WO2023/287487
PCT Pub. Date: Jan. 19, 2023

(65) Prior Publication Data
US 2024/0267131 A1 Aug. 8, 2024

Related U.S. Application Data

(60) Provisional application No. 63/191,477, filed on May 21, 2021.

(51) Int. Cl.
*H04B 10/00* (2013.01)
*H04B 10/61* (2013.01)
(Continued)

(52) U.S. Cl.
CPC ........... *H04B 10/70* (2013.01); *H04B 10/615* (2013.01)

(58) Field of Classification Search
CPC ...................................................... H04B 10/70
See application file for complete search history.

(56) References Cited

U.S. PATENT DOCUMENTS 10,193,722 B2   1/2019   Guha
10,389,526 B2   8/2019   Zhang et al.
(Continued)

OTHER PUBLICATIONS

Rengaswamy et al., "Bellet propagation with quantum messages for quantum-enhanced classical communications", arXiv, 29 pages, Publication [online], Mar. 9, 2020, Site Visited [Jan. 18, 2023], Retrieved from Internet URL: https://www.researchgate.net/profile/Narayanan-Rengaswamy/publication/339840892_Belief_propagation_with_quantum_messages_for_quantum-enhanced_classical_communications/links/5e8204c5458515efa0bbe8f1/Belief-propagation-with-quantum-messages-for-quantum-enhanced-classical-communications.

(Continued)

*Primary Examiner* — Daniel G Dobson
(74) *Attorney, Agent, or Firm* — Cozen O'Connor

(57) ABSTRACT

Processing codewords comprises: receiving encoded signals associated with reference signals related by quantum entanglement, where the encoded signals have been encoded with respective phases corresponding to symbols of a particular codeword; performing a first nonlinear optical process with inputs comprising a first signal derived from the encoded signals and a first signal derived from the reference signals; performing a second nonlinear optical process with inputs comprising a second signal derived from the encoded signals and a signal derived from a first output of the first nonlinear optical process; performing a first linear optical process with inputs comprising a signal derived from a (Continued)

second output of the first nonlinear optical process and a signal derived from a first output of the second nonlinear optical process; and processing information that includes signals derived from one or more outputs of the first linear optical process to generate an estimate of the particular codeword.

20 Claims, 12 Drawing Sheets

(51) Int. Cl.
*H04B 10/70* (2013.01)
*H04J 14/00* (2006.01)

(56) References Cited

U.S. PATENT DOCUMENTS

| | | | |
|---|---|---|---|
| 10,452,989 | B2 | 10/2019 | Majumdar |
| 2012/0177385 | A1 | 7/2012 | Guha |
| 2013/0292472 | A1 | 11/2013 | Guha |
| 2017/0264373 | A1* | 9/2017 | Krovi ............... H04Q 11/0005 |
| 2021/0125096 | A1 | 4/2021 | Puri et al. |
| 2023/0231353 | A1* | 7/2023 | Marlow ............... G02F 1/3536 372/9 |

OTHER PUBLICATIONS

S. Guha, "Structured Optical Receivers to Attain Superadditive Capacity and the Holevo Limit", Physical Review Letters, vol. 106, No. 24, pp. 1-4, Jan. 7, 2011, DOI: 10.1103/physrevlett.106.240502.
S. Guha et al., "On quantum limit of optical communications: Concatenated codes and joint-detection receivers", IEEE, pp. 1-5, Feb. 9, 2011, DOI: 10.1109/isit.2011.6034073.
J. M. Renes, "Belief propagation decoding of quantum channels by passing quantum messages", New Journal of Physics, vol. 19, No. 7, pp. 1-7, Jul. 5, 2017, DOI: 10.1088/1367-2630/aa7c78.
H. Shi et al., "Practical Route to Entanglement-Assisted Communication Over Noisy Bosonic Channels", Physical Review Applied, vol. 13, No. 3, pp. 1-16, Mar. 12, 2020, DOI: 10.1103/physrevapplied.13.034029.
S. Guha et al., "Infinite-fold enhancement in communications capacity using pre-shared entanglement", 2020 IEEE International Symposium on Information Theory, pp. 1-12, Jan. 18, 2020, DOI: 10.1109/isit44484.2020.9173940.
N. Rengaswamy et al., "Belief propagation with quantum messages for quantum enhanced classical communications", npj Quantum Information, vol. 7, No. 1, pp. 1-22, May 7, 2021, DOI: 10.1038/s41534-021-00422-1.
N. Rengaswamy et al., "Quantum-Message Passing Receiver for Quantum-Enhanced Classical Communications", arXiv preprint, pp. 1-28, Mar. 9, 2020, arXiv:2003.04356v1.
S. Hao et al., "Entanglement-Assisted Communication Surpassing the Ultimate Classical Capacity", American Physical Society, Phys. Rev. Lett., pp. 1-12, Jan. 19, 2021, DOI: 10.1103/PhysRevLett.126.250501.
C. Delaney et al., "Demonstration of a quantum advantage by a joint detection receiver for optical communication using quantum belief propagation on a trapped-ion device", American Physical Society, Physical Review A, pp. 1-15, Feb. 25, 2021, DOI: 10.1103/physreva.106.032613.
C. Piveteau et al., "Quantum message-passing algorithm for optimal and efficient decoding", arXiv preprint, pp. 1-55, Sep. 16, 2021, arXiv:2109.08170v1.
A. S. Holevo et al., "Evaluating capacities of Bosonic Gaussian channels", arXiv, quant-ph, pp. 1-14, Dec. 14, 1999, DOI: 10.48550/arXiv.quant-ph/9912067.
N. Rengaswamy et al., "Belief propagation with quantum messages for quantum-enhanced classical communications", npj Quantum Inf 7, 97, Jun. 15, 2021, DOI: 10.1038/s41534-021-00422-1.
Q. Zhuang et al., "Optimum mixed-state discrimination for noisy entanglement-enhanced sensing", 2017 Conference on Lasers and Electro-Optics (CLEO), 2 pages, 2016, https://api.semanticscholar.org/CorpusID:199682002.
S. Guha et al., "Gaussian-state quantum-illumination receivers for target detection", American Physical Society, Phys. Rev. A, pp. 1-5, Nov. 4, 2009, DOI: 10.1103/PhysRevA.80.052310.
J. Chen et al., "Optical codeword demodulation with error rates below standard quantum limit using a conditional nulling receiver", Nature Photonics, 7 pages, Nov. 25, 2011, DOI: 10.1038/nphoton.2012.113.
Q. Zhuang et al., "Optimum Mixed-State Discrimination for Noisy Entanglement-Enhanced Sensing", American Physical Society, Phys. Rev. Lett., pp. 1-15, Nov. 29, 2016, DOI: 10.1103/PhysRevLett.118.040801.
M. Jarzyna et al., "Efficiency of optimized pulse position modulation with noisy direct detection", 2017 IEEE International Conference on Space Optical Systems and Applications, 6 pages, Sep. 5, 2017, DOI: 10.1109/csos.2017.8357229.
Q. Zhuang et al., "Distributed quantum sensing using continuous-variable multipartite entanglement", American Physical Society, Phys. Rev. A, pp. 1-7, Mar. 27, 2018, DOI: 10.1103/PhysRevA.97.032329.
C. N. Gagatsos et al., "Covert Capacity of Bosonic Channels", IEEE Journal on Selected Areas in Information Theory, pp. 1-35, Aug. 6, 2020, DOI: 10.1109/jsait.2020.3017199.
Quntao Zhuang, "Quantum Ranging with Gaussian Entanglement", American Physical Society, Physical Review Letters, pp. 1-10, Apr. 1, 2021, DOI: 10.1103/physrevlett.126.240501.
A. S. Holevo et al., "Entanglement-assisted capacity of constrained channels", SPIE, pp. 1-13, Jan. 4, 2003, DOI: 10.1117/12.517873.
V. Giovannetti et al., "Broadband channel capacities", American Physical Society, Physical Review A, pp. 1-11, Jul. 14, 2003, DOI: 10.1103/physreva.68.062323.

\* cited by examiner

Binary phase RM code (example L = 4):   302

$$\underbrace{\begin{matrix} \pi & \pi & \pi & \pi \\ \pi & 0 & \pi & 0 \\ \pi & \pi & 0 & 0 \\ \pi & 0 & 0 & \pi \end{matrix}}_{-} \underbrace{\begin{matrix} 0 & 0 & 0 & 0 \\ 0 & \pi & 0 & \pi \\ 0 & 0 & \pi & \pi \\ 0 & \pi & \pi & 0 \end{matrix}}_{+}$$

→ One of the 2L code-words (L,k) LDPC code (example L=6, k=3):   402

$$\pi\left(\begin{pmatrix}1 & 0 & 1\end{pmatrix} \cdot_{GF(2)} \begin{bmatrix}1 & 0 & 0 & 1 & 0 & 1\\ 0 & 1 & 0 & 1 & 1 & 1\\ 0 & 0 & 1 & 1 & 1 & 0\end{bmatrix}\right)$$

message (encoded boxed as $(1\ 0\ 1)$)

$= \begin{pmatrix}\pi & 0 & \pi & 0 & \pi & \pi\end{pmatrix}$ encoded message

PROCESSING SIGNALS USING ENTANGLEMENT-ASSISTED COMMUNICATION

CROSS-REFERENCE TO RELATED APPLICATION(S)

This application claims priority to and the benefit of U.S. Provisional Application Patent Ser. No. 63/191,477, entitled "PROCESSING SIGNALS USING ENTANGLEMENT-ASSISTED COMMUNICATION," filed May 21, 2021, the entire disclosure of which is hereby incorporated by reference.

STATEMENT AS TO FEDERALLY SPONSORED RESEARCH

This invention was made with government support under Grant No. 1941583, awarded by NSFR. The government has certain rights in the invention.

TECHNICAL FIELD

This disclosure relates to processing signals using entanglement-assisted communication.

BACKGROUND

Some communication systems leverage pre-shared entanglement (e.g., continuous-variable entanglement from a down-conversion source), which is able to increase communication capacity.

SUMMARY

In one aspect, in general, a method for processing a stream of codewords, each codeword selected from a set of codewords, each codeword comprising a plurality of symbols associated with a symbol constellation, comprises: receiving a set of encoded signals associated with a set of reference signals, where the set of encoded signals have been encoded with respective phases corresponding to symbols of a particular codeword of the stream, and where one or more of the set of encoded signals are each related to a corresponding one of the set of reference signals by quantum entanglement; performing a first nonlinear optical process with inputs comprising a first signal derived from the set of encoded signals and a first signal derived from the set of reference signals; performing a second nonlinear optical process with inputs comprising a second signal derived from the set of encoded signals and a signal derived from a first output of the first nonlinear optical process; performing a first linear optical process with inputs comprising a signal derived from a second output of the first nonlinear optical process and a signal derived from a first output of the second nonlinear optical process; and processing information that includes a set of signals derived from one or more outputs of the first linear optical process to generate an estimate of the particular codeword.

Aspects can include one or more of the following features.

The method further comprises: performing a third nonlinear optical process with inputs comprising a third signal derived from the set of encoded signals and a second signal derived from the set of reference signals; performing a fourth nonlinear optical process with inputs comprising a fourth signal derived from the set of encoded signals and a signal derived from a first output of the third nonlinear optical process; and performing a second linear optical process with inputs comprising a signal derived from a second output of the third nonlinear optical process and a signal derived from a first output of the fourth nonlinear optical process.

The method further comprises performing a third linear optical process with inputs comprising a signal derived from the one or more outputs of the first linear optical process and a signal derived from one or more outputs of the second linear optical process.

The set of signals being processed to generate an estimate of the particular codeword further comprises the signal derived form the one or more outputs of the second linear optical process and a set of signals derived from one or more outputs of the third linear optical process.

One of the signals in the set of signals derived from the one or more outputs of the third linear optical process is a non-vacuum coherent state.

The one or more outputs of the third linear optical process, excluding the signal in a non-vacuum coherent state, are in a vacuum state.

The method further comprises measuring the signal in a non-vacuum coherent state and the one or more signals in a vacuum state.

The method further comprises combining, with a beam splitter, a remaining portion of the non-vacuum coherent state, after measurement, with a local oscillator; measuring one or more outputs of the beam splitter; and determining if the one or more outputs of the beam splitter are a non-vacuum coherent state or a vacuum state.

The estimate of the particular codeword is generated based at least in part on an outcome of the determining.

The first nonlinear optical process and the second nonlinear optical process are sum-frequency generation.

The first linear optical process uses at least one beam splitter.

The first signal derived from the set of encoded signals and the second signal derived from the set of encoded signals are each derived by using respective beam splitters to split the encoded signals.

One or more transmissivities of the respective beam splitters are chosen such that the first signal derived from the set of encoded signals and the second signal derived from the set of encoded signals each contain a mean photon number less than ten.

The set of encoded signals are a set of encoded optical signals.

Receiving the set of encoded signals comprises converting a set of encoded radio frequency signals into the set of encoded optical signals.

The method further comprises storing the reference signals until the encoded signals have been received.

The quantum entanglement is created by spontaneous parametric down-conversion.

In another aspect, in general, a method for processing a stream of codewords, each codeword selected from a set of codewords, each codeword comprising a plurality of symbols associated with a symbol constellation, comprises: receiving a set of optical reference signals associated with a set of radio frequency (rf) input signals, where one or more of the optical reference signals are each related to a corresponding one of the rf input signals by quantum entanglement; storing the optical reference signals until the rf input signals have been received; receiving the rf input signals, where the rf input signals have been encoded with respective phases corresponding to symbols of a particular codeword of the stream; performing photon-to-qubit transduction on a plurality of the rf input signals to initialize a set of input qubits of a universal quantum processor; performing photon-to-qubit transduction on a plurality of inputs derived from the stored optical reference signals to initialize a set of input qubits of the universal quantum processor; and executing a quantum circuit on the universal quantum processor to generate a set of estimated symbols for estimating the particular codeword.

In another aspect, in general, an apparatus for processing a stream of codewords, each codeword selected from a set of codewords, each codeword comprising a plurality of symbols associated with a symbol constellation, comprises: a reference module providing a set of reference signals; and a processing module configured to process the stream of codewords based on the reference signals. The processing comprises: receiving a set of encoded signals associated with the set of reference signals, where the set of encoded signals have been encoded with respective phases corresponding to symbols of a particular codeword of the stream, and where one or more of the set of encoded signals are each related to a corresponding one of the set of reference signals by quantum entanglement; performing a first nonlinear optical process with inputs comprising a first signal derived from the set of encoded signals and a first signal derived from the set of reference signals; performing a second nonlinear optical process with inputs comprising a second signal derived from the set of encoded signals and a signal derived from a first output of the first nonlinear optical process; performing a first linear optical process with inputs comprising a signal derived from a second output of the first nonlinear optical process and a signal derived from a first output of the second nonlinear optical process; and processing information that includes a set of signals derived from one or more outputs of the first linear optical process to generate an estimate of the particular codeword.

In another aspect, in general, an apparatus for processing a stream of codewords, each codeword selected from a set of codewords, each codeword comprising a plurality of symbols associated with a symbol constellation, comprises: a reference module providing a set of optical reference signals; and a processing module configured to process the stream of codewords based on the optical reference signals. The processing comprises: receiving the set of optical reference signals associated with a set of radio frequency (rf) input signals, where one or more of the optical reference signals are each related to a corresponding one of the rf input signals by quantum entanglement; storing the optical reference signals until the rf input signals have been received; receiving the rf input signals, where the rf input signals have been encoded with respective phases corresponding to symbols of a particular codeword of the stream; performing photon-to-qubit transduction on a plurality of the rf input signals to initialize a set of input qubits of a universal quantum processor; performing photon-to-qubit transduction on a plurality of inputs derived from the stored optical reference signals to initialize a set of input qubits of the universal quantum processor; and executing a quantum circuit on the universal quantum processor to generate a set of estimated symbols for estimating the particular codeword.

Aspects can have one or more of the following advantages.

Some of the techniques described herein enable a joint-detection scheme that improves upon previous techniques for communication of classical information encoded in the phases of the correlations between halves of an entangled Gaussian state pre-shared between the sender and receiver. Joint detection can be used to attain the Holevo capacity (ultimate upper bound on the number of bits per channel use that can be reliably transmitted over the channel) in the low signal brightness limit for any transceiver that sends classical information over a quantum channel. The techniques can be useful for entanglement-assisted communication as the ultimate entanglement-assisted Holevo capacity has the most advantage over the unassisted Holvo capacity in the high-noise, high-loss, low signal brightness regime. The receiver is able to provide improvement in communication rates over lossy, noisy channels such as free-space microwave frequency communications, deep space communications, and covert communications, for example.

Other features and advantages will become apparent from the following description, and from the figures and claims.

BRIEF DESCRIPTION OF THE DRAWINGS

The disclosure is best understood from the following detailed description when read in conjunction with the accompanying drawing. It is emphasized that, according to common practice, the various features of the drawing are not to-scale. On the contrary, the dimensions of the various features are arbitrarily expanded or reduced for clarity.

FIG. 31) is a schematic diagram of an example receiver module.

FIG. 41) is a schematic diagram of an example belief propagation circuit.

DETAILED DESCRIPTION

Figure 1:
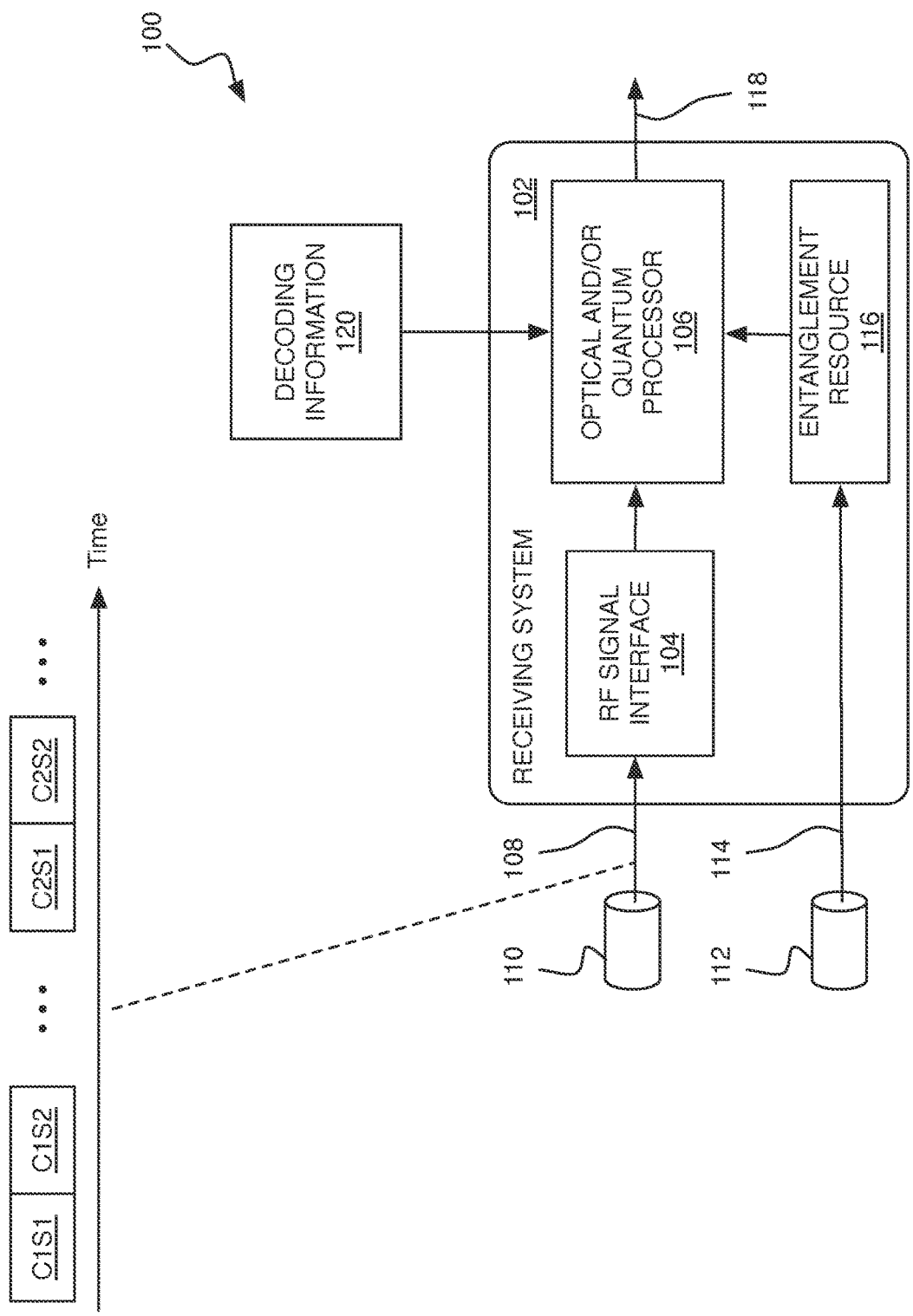
FIG. 1 is a schematic diagram of an example communication system.

Referring to FIG. 1, an example of a communication system 100 includes a receiving system 102 that includes a radio frequency (rf) signal interface 104 and an optical and/or quantum processor 106. The rf signal interface 104 receives as input a modulated rf signal 108 that comprises a plurality of codewords from an rf channel 110 (e.g., which may include a free-space propagation channel). Each codeword has been selected from a predetermined code (i.e., a predetermined set of codewords), and each codeword comprises multiple symbols, where the different possible symbols that can appear in a codeword are from an associated symbol constellation. There is also optical channel 112 (e.g., an optical fiber-based communications channel) providing an optical reference signal 114. The optical reference signal 114 is related to the rf signal 108 by quantum entanglement and can be temporarily stored (e.g., in a low loss optical fiber delay loop storage, a trapped-ion qubit storage, superconducting Josephson Junction qubit storage, diamond-defect vacancy color center storage, and/or cold atom qubit storage) in an entanglement resource module 116. In some implementations, the optical reference signal 114 can be provided as a resource of pre-shared entanglement from a reference module, such as the entanglement resource module 116, that does not necessarily require local storage when providing a reference signal that supplies the pre-shared entanglement. The optical and/or quantum processor 106 is able to use the pre-shared entanglement as a resource to process an optical signal converted by the rf signal interface 104 from the rf signal 108 and generate a set of estimated symbols 118 as an output. In some implementations, the optical and/or quantum processor 106 can include optical processing components, such as some of the components described U.S. Pat. No. 10,193,722, incorporated herein by reference.

The optical and/or quantum processor 106 can include a universal quantum processor that processes qubits (e.g., a universal trapped-ion quantum processor). In some implementations, quantum states corresponding to the symbols encoded on optical signals are not immediately detected, or measured in any way, but are mapped to states of input qubits (also called a "code qubit") for the universal quantum processor. In some implementations, mapping these quantum states to input qubits may include converting an optical qubit to another form of qubit stored in a particular kind of qubit storage element (e.g., a trapped atom, or a superconducting circuit). In other implementations, no conversion is needed, and the optical qubits can be operated upon using a form of optical quantum operations (e.g., using a cat-basis logic). In the example illustrated in FIG. 1, there are a sequence of symbols C1S1, C1S2, . . . that make up a first codeword (C1), and a sequence of symbols C2S1, C2S2, . . . that make up a second codeword (C2), and so on, in a series of codewords that make up a signal waveform of the rf signal 108. The processor 106 then applies quantum operations, according to a particular quantum circuit, to help determine the estimated symbols 118. For example, the quantum circuit may be loaded into the processor 106 from a collection of configuration information 120 stored in a machine-readable storage device (e.g., volatile or non-volatile storage media of a computer system controlling the receiving system 102).

Transmission of electromagnetic (EM) waves in linear media, such as optical fiber, atmosphere, and vacuum, can be described as propagation of a set of mutually-orthogonal spatio-temporal-polarization modes over the single-mode lossy bosonic channel with additive thermal-noise described by the Heisenberg evolution $\hat{a}_R = \sqrt{\eta}\hat{a}_S + \sqrt{1-\eta}\hat{a}_E$, where $\eta \in (0, 1]$ is the modal (power) transmissivity, and the environment $\hat{a}_E$ is excited in a zero-mean thermal state of mean photon number per mode $\overline{N}_B$. If a coherent state $|\alpha\rangle$, $\alpha \in \mathbb{C}$ is transmitted at the input of the channel, the output state $\hat{\rho}_{th}(\sqrt{\eta}\alpha, \overline{N}_T)$ is a single-mode displaced thermal state with mean field amplitude, $\sqrt{\eta}\alpha$, and thermal-noise mean photon number, $\overline{N}_T = (1-\eta)\overline{N}_B$. Its density operator is given by:

$$\hat{\rho}_{th}(\sqrt{\eta}\alpha, \overline{N}_T) = \int_{\mathbb{C}} \frac{1}{\pi \overline{N}_T} e^{-|\beta - \sqrt{\eta}\alpha|^2 / \overline{N}_T} |\beta\rangle\langle\beta| d^2\beta, \quad (1)$$

where $|\beta\rangle$, $\beta \in \mathbb{C}$ is a coherent state. Alice may encode classical information by modulating the state of the $\hat{a}_S$ modes, with $\overline{N}_S$ mean photons transmitted per mode (e.g., the coherent-state amplitude $\alpha_i$ of the i-th transmitted mode has a mean photon number $\overline{N}_S = \langle \alpha_i \rangle$). The quantum limit of the classical communications capacity, known as the Holevo capacity, is given by (in bits per mode):

$$C(\eta, \overline{N}_S, \overline{N}_B) = g(\overline{N}'_S) - g((1-\eta)\overline{N}_B), \quad (2)$$

where $\overline{N}'_S \equiv \eta \overline{N}_S + (1-\eta)\overline{N}_B$ is the mean photon number per the $\hat{a}_R$ mode at the channel's output received by Bob, and $g(x) \equiv (1+x)\log(1+x) - x\log(x)$ is the von Neumann entropy of a zero-mean single-mode thermal state with mean photon number x.

If Alice and Bob pre-share an unlimited amount of entanglement as a resource for transmitting classical data over the single-mode lossy bosonic channel with additive thermal-noise with a transmit photon number constraint of $\overline{N}_S$ photons per mode, the capacity (in bits per mode) increases to $C_E$, the entanglement assisted classical capacity of the quantum channel. In the regime of a low-brightness transmitter ($\overline{N}_S \ll 1$) and high thermal noise ($\overline{N}_B \gg 1$), $$C_E/C \approx \ln(1/\overline{N}_S), \quad (3)$$

which tends to infinity as $\overline{N}_S \to 0$. Physically, this means that for a fixed number of channel uses, i.e., transmitted modes, a receiver that has access to a quantum system entangled with the transmitted modes can extract many more message bits reliably per mode, in the low-signal-brightness high-thermal-noise regime, compared with a receiver that has no such access. The practical implications are potentially revolutionary in radio-frequency (RF) communications, since the condition $\overline{N}_B \gg 1$ is naturally satisfied at a long center wavelength. The $\overline{N}_S \ll 1$ regime is of particular interest to covert communications, where the transmitter tries to hide the presence of the communication attempt.

Binary phase-shift keying (BPSK) phase modulation of a two-mode-squeezed vacuum source can be shown to be $C_E$-achieving. Without intending to be bound by theory, for describing some examples, we consider example communication systems that use BPSK phase modulation of a two-mode squeezed vacuum (TMSV) as an example message encoding scheme.

Figure 2:
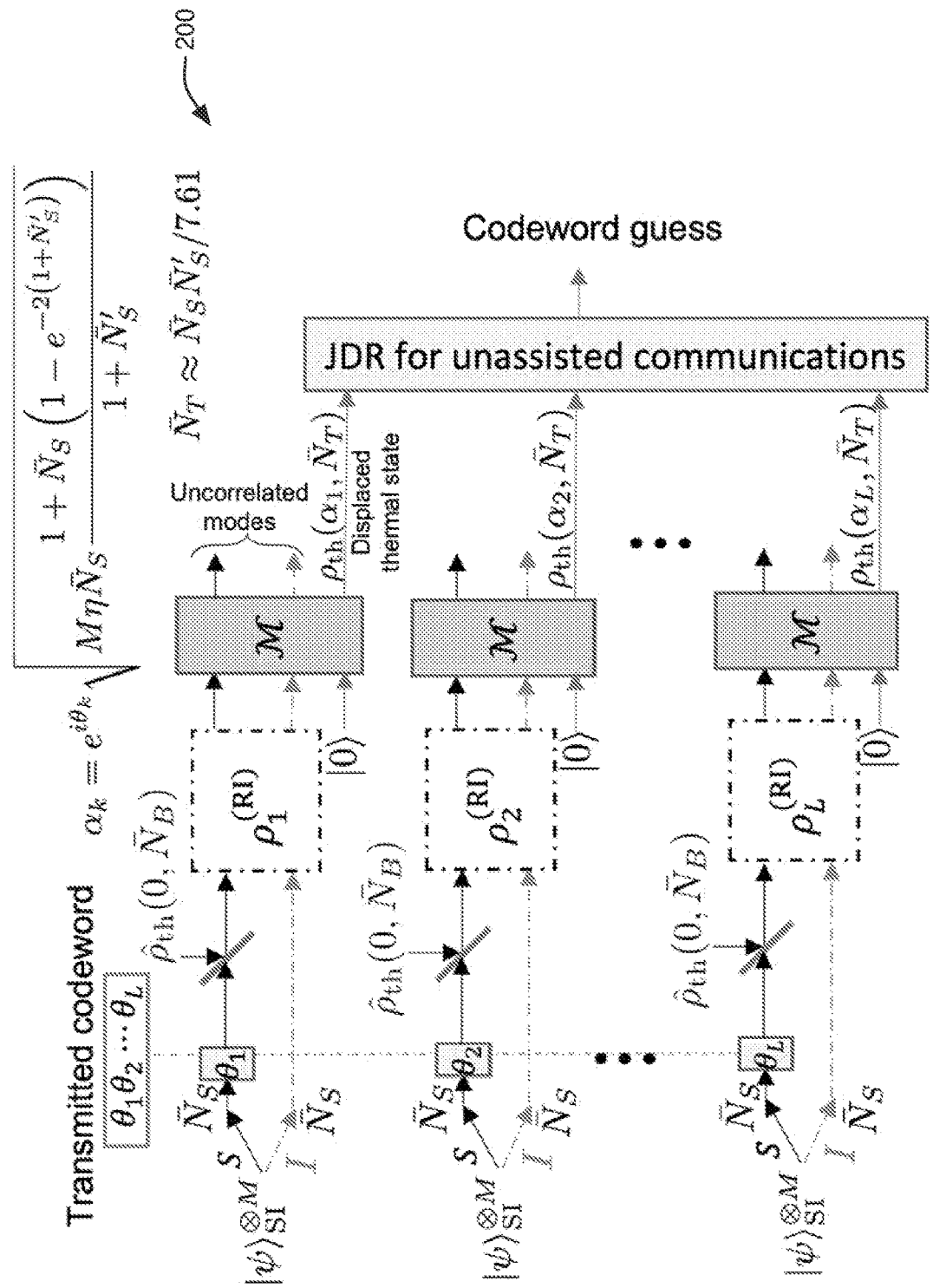
FIG. 2 is a schematic diagram of an example communication system.

FIG. 2 shows an example of a communication system 200. The communication system 200 uses quantum or optical methods (e.g., sum-frequency-generation or a quantum computer) to distill information encoded in the phases of the cross-correlation between the transmitted signal and the receiver-end idler counterpart with which the signal is entangled. In this example, an entanglement source generates a pair of entangled modes comprising a signal mode and an idler mode. The signal mode is encoded with a message symbol that is to be transmitted from the transmitter portion to the receiver portion of the communication system 200. The idler mode is not encoded with any message, but is transmitted from the transmitter portion to the receiver portion to assist with the process of recovering the message symbol. The entanglement source can generate a series of entangled pairs of signal and idler modes, for example, using spontaneous parametric down-conversion (SPDC). In some implementations, the state of either the signal or idler can be temporarily stored during the communication process. For example, if the process of encoding a message onto the signal mode and/or any other transduction or frequency conversion steps introduce any delays in transmission of the signal mode, the idler mode that corresponds to the signal mode being encoded can be transmitted to the receiver and temporarily stored at the receiver (or anywhere between the transmitter and receiver) before it is used by the receiver, as described in more detail below.

A quantum description of the pair of signal-idler entangled pulses is $|\psi\rangle_{SI}^M$, where $M \approx WT$ is the number of mutually-orthogonal temporal modes in each of the signal and idler pulses. As an example, we consider pre-shared two-mode squeezed vacuum (TMSV) states, $$|\psi\rangle_{SI} = \sum_{j=0}^{\infty} \sqrt{\bar{N}_S^j/(1+\bar{N}_S)^{j+1}} |j\rangle_S |j\rangle_I.$$

Alice's phase modulation of the signal mode as of a TMSV state, followed by its transmission through single-mode lossy bosonic channel with additive thermal-noise, results in an output mode da received by Bob with a (possibly large) mean photon number $\bar{N}'_S = \eta \bar{N}_S + (1-\eta)\bar{N}_B$. A beam splitter shows the addition of a zero-mean thermal state, resulting from the environment, to the transmitted signal. Mode $\hat{a}_R$ and the (possibly weak) idler mode of the TMSV $\hat{a}_I$ with mean photon number $\bar{N}_S$ held by Bob are individually in zero-mean thermal states. However, their joint quantum state is a classically-correlated zero-mean Gaussian state, with a phase sensitive cross correlation $$\langle \hat{a}_R \hat{a}_I \rangle = \pm \sqrt{\eta \bar{N}_S (\bar{N}_S + 1)},$$

where the sign depends on the phase (0 or $\pi$) modulated by Alice. A quantum map (e.g., sum-frequency-generation) depicted by the box labeled M (in FIG. 2) maps multiple signal-idler mode pairs onto an equal number of displaced thermal states whose displacements are proportional to the phase-sensitive cross correlation of the mapped signal-idler pairs.

Methods of unassisted classical communication (e.g., a joint-detection receiver (JDR)) can be used on the displaced thermal states to improve communication rates, possibly enabling communication at the entanglement-assisted Holevo capacity. For example, the receiver may perform a joint quantum measurement on the L-mode received codeword, each of whose L symbols are displaced thermal states as above, to make a guess j on which codeword was transmitted.

Figure 3A:
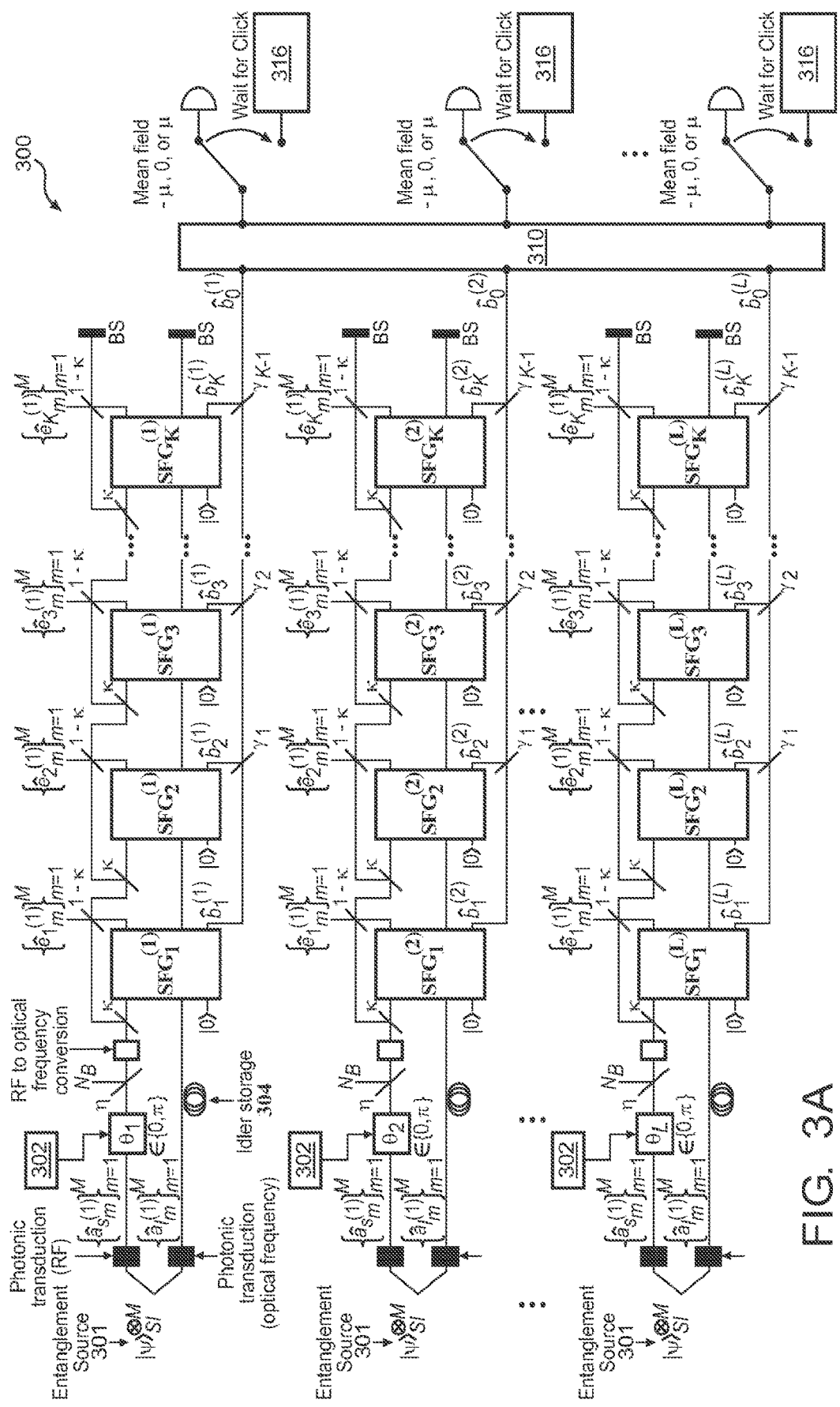
FIG. 3A is a schematic diagram of an example communication system.

FIG. 3A shows an example of a communication system 300. The communication system 300 uses a mode combining module 310 to combine modes from sum-frequency-generation-based correlation-displacement conversion. The transmitter portion of the system includes a an entanglement source 301 that provides entangled signal-idler photon pairs, which are used to share entanglement between the transmitter portion and the receiver portion by use of the signal for encoding and separate transmission of the idler to the receiver portion. An encoder 302 encodes a message onto the signal channel. A corresponding idler channel includes idler storage 304, which can be located in a receiver portion of the system, or at a location between the transmitter and receiver portions. The idler can be stored until the modulated signal is received. The receiver portion of the system includes modules that perform sum-frequency generation (SFG), a non-linear optical process that runs spontaneous parametric down-conversion in reverse per the Hamiltonian $\hat{H}_{SFG} = \hbar g \Sigma_{m=1}^M (\hat{b}^\dagger \hat{a}_{S_m} \hat{a}_{I_m} + \hat{b} \hat{a}_{S_m}^\dagger \hat{a}_{I_m}^\dagger)$, with $\hbar$ the reduced Planck constant, and g the non-linear interaction strength. Signal-idler photon pairs from the M input mode pairs $\{\hat{a}_{S_m}, \hat{a}_{I_m}\}$, $1 \leq m \leq M$, are up-converted to a sum-frequency mode $\hat{b}$. The phase-sensitive cross-correlation at the input of the SFG, $\langle \hat{a}_{S_m} \hat{a}_{I_m} \rangle$ manifests as the mean field amplitude of a thermal state of $\hat{b}$. The states of the modes $\hat{b}_0^{(l)}$, with $1 \leq l \leq L$, are in displaced thermal states whose displacement carries information about the phase-dependent correlations of the signal-idler mode pairs at the front end of the SFG module.

Figures 3B, 3C:
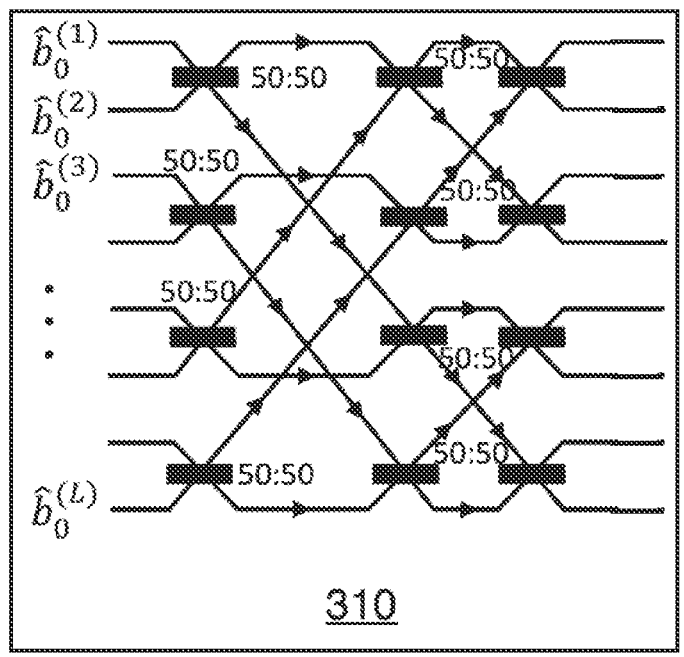
FIG. 3B is a schematic diagram of an example mode combining module.
FIG. 3C is a schematic diagram of an example encoding scheme.

Referring to FIG. 3B, an example implementation of the mode combining module 310 comprising a linear optical process that uses partially transmissive beamsplitters (e.g., with a 50:50 splitting ratio) is able to combine the displacements of these thermal states into a single output, the index 1, which depends on the received codeword. Referring again to FIG. 3A, sum-frequency-generation (SFG) is a unitary operation that effectively converts phase-sensitive cross correlation into a coherent displacement on an auxiliary vacuum mode called the sum-frequency mode when the input signal and idler are dim. Since the signal may acquire bright noise on the way to the receiver, the signal is diminished by successively feeding the SFG with small chunks of the received signal split off from the main beam by an array of low transmissivity (κ) beam splitters. The sum-frequency mode outputs of the successive SFG operations acting on a given signal-idler pair are then combined on an array of beam splitters with transmissivities $\{\gamma_\kappa\}_{\kappa=1}^{K-1}$ tuned to combine (for example, maximally) the coherent displacements of the sum-frequency modes. The resultant output is a single displaced thermal state with displacement equal to the cross-correlation between the received signal-idler pair.

Figure 3D:
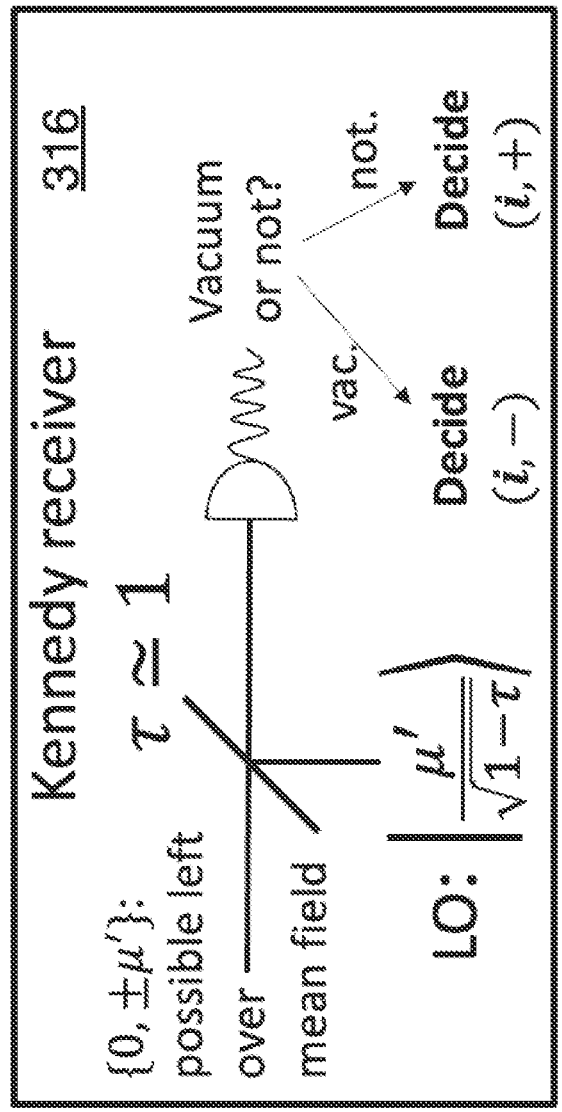

Referring to FIG. 3C, the system 300 can use a BPSK Reed-Muller (RM) code book for phase modulation used by the encoder 302, and the mode combining module 310 at the back end coverts each RM codeword into a pulse-position-moulation (PPM) codeword where the pulse carrying mode might be positive-displaced or negative-displaced depending on the parity of the codeword received. Referring again to FIG. 3A, to decode this additional bit of information, the PPM codewords output by the mode combining module 310 are detected using a photon detector which switches and feeds a remaining pulse into a Kennedy receiver 316 after the first click is detected. For example, as shown in FIG. 3D, the Kennedy receiver 316 combines the remaining pulse and a strong local oscillator (LO) with a beam splitter such that the output of the beam splitter results in either vacuum or not vacuum. The output of the beam splitter may then be detected by a photodiode, and the result may be used to predict the transmitted codeword. In alternative implementations, the Kennedy receiver may be replaced with a Dolinar receiver for a small performance boost, but the capacity analysis could be complicated by the presence of thermal noise in the remaining pulse after a click occurs.

Figure 4A:
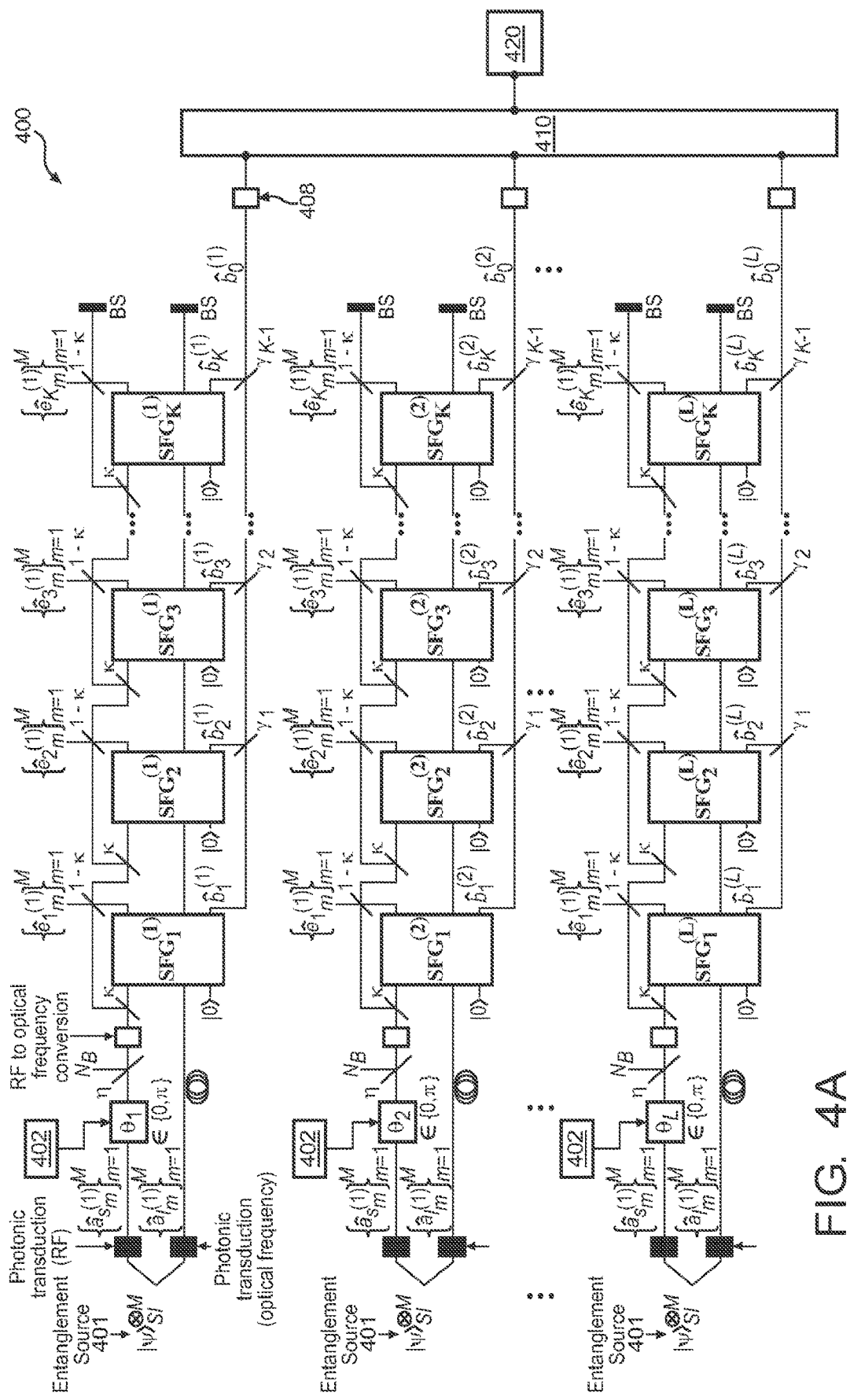
FIG. 4A is a schematic diagram of an example communication system.
Figure 6A:
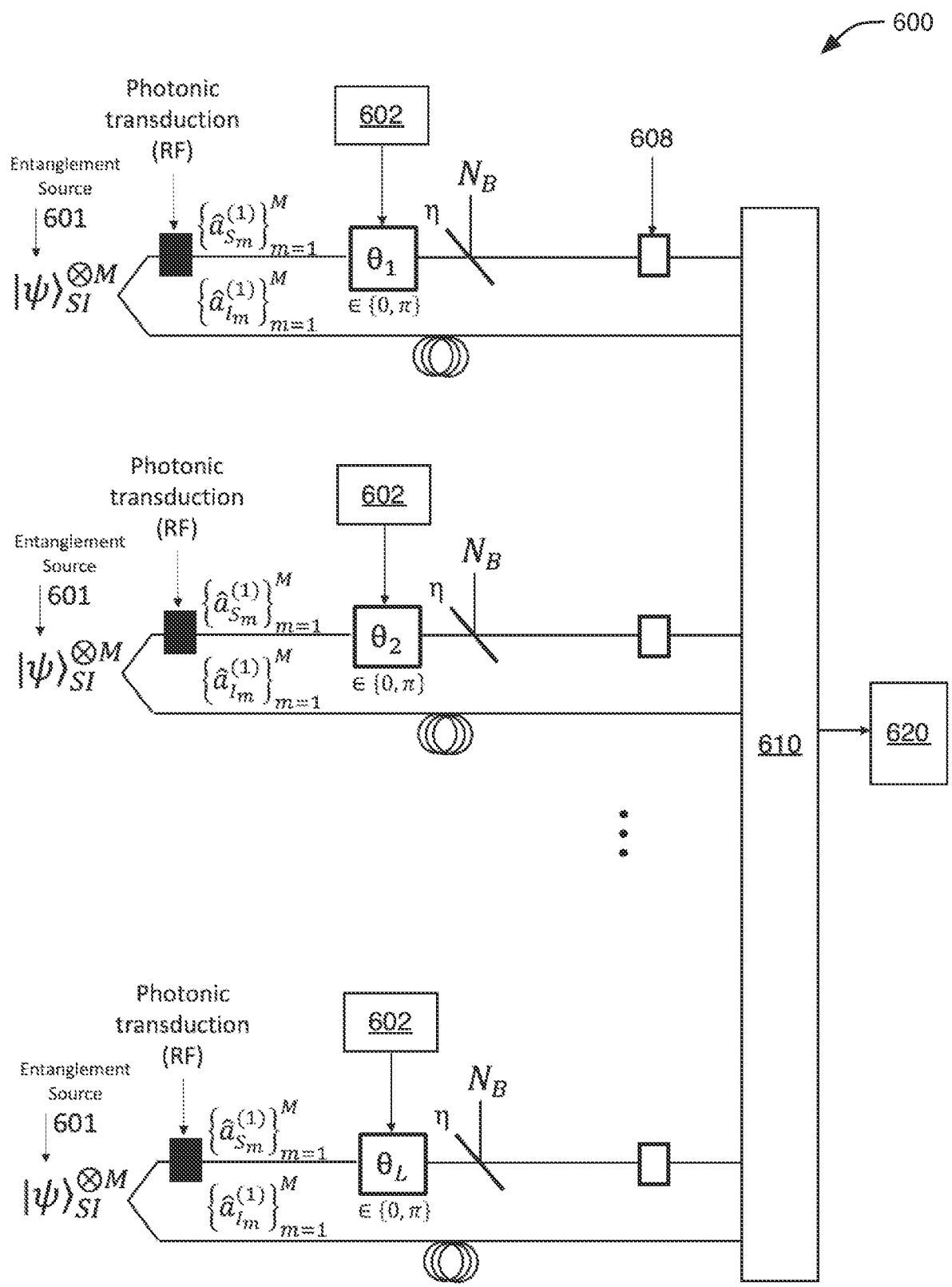
FIG. 6A is a schematic diagram of an example communication system.

The transmitter portion of the system 300 may have a photonic transduction stage, depicted by the filled boxes for the signal/idler in FIG. 3A, FIG. 4A and FIG. 6A, before the modulation applied by encoders 302, 402, 602, so that if the entanglement source is ion-qubit-based, for example, the signal-idler pair transmitted through the channel is a correlated Bosonic Gaussian state. For the signal path, there can be an optional transduction from optical to RF frequency before the encoder, and then a corresponding transduction from RF to optical frequency at the receiver portion. For the idler path, there can be an optional transduction between different optical frequencies.

Figures 4B, 4C:
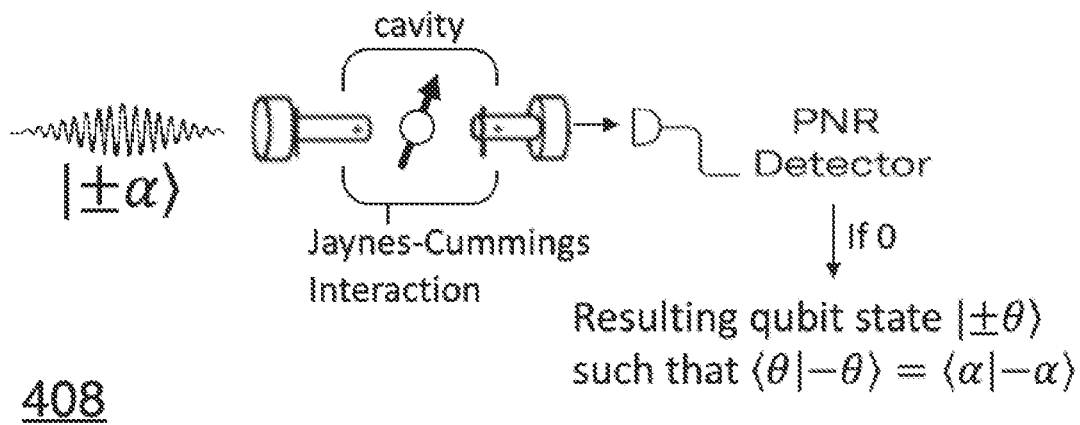
FIG. 4B is a schematic diagram of an example encoding scheme.
FIG. 4C is a schematic diagram of an example transduction stage.
Figure 4D:
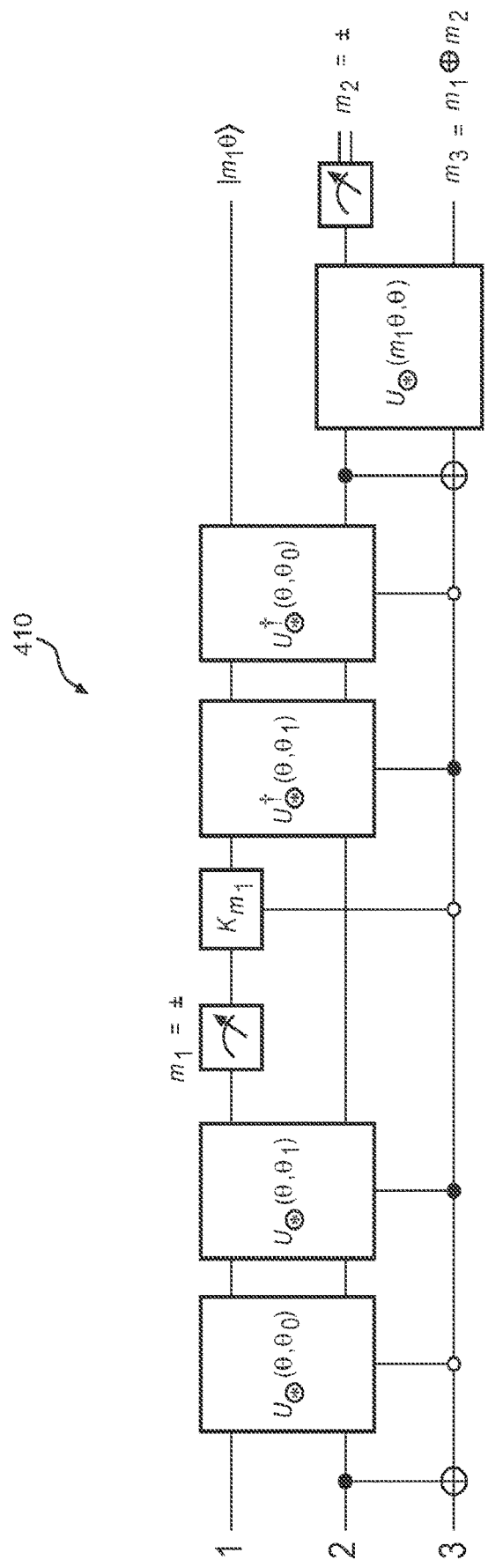

FIG. 4A shows an example communication system 400 with a similar entanglement source 401, which uses a LDPC code (codeword length L, number of codewords $2k$) for an encoder 402 and a quantum belief propagation circuit (BPC) 410, which can be implemented as a quantum circuit executed on a quantum processor for decoding the quantum message encoded in the BPSK displacements of the states of modes $\{\hat{b}_0^{(l)}\}_{l=1}^{L}$, which is able to attain the unassisted Holevo capacity. FIG. 4B shows an example encoding scheme that can be used by the encoder 402. An example implementation of the Photon-Ion transduction stage 408 is shown in FIG. 4C. FIG. 4D shows an example BPC 410 circuit that is designed to decode a single logical bit encoded in 3 qubits (L=3). A Photon-Ion transduction stage 408 may be used if the BPC 410 is implemented in conjunction with a quantum processor (e.g., a trapped ion quantum computer). An example implementation of such a BPC 410 is described in more detail in Rengaswamy, N., Seshadreesan, K. P., Guha, S. et al. "Belief propagation with quantum messages for quantum-enhanced classical communications," npj (nature partner journals) Quantum Information 7, 97 (2021), incorporated herein by reference. At the output of the BPC 410, a decision module 420 makes a decision to estimate a codeword that was used to modulate the phases.

Figure 5A:
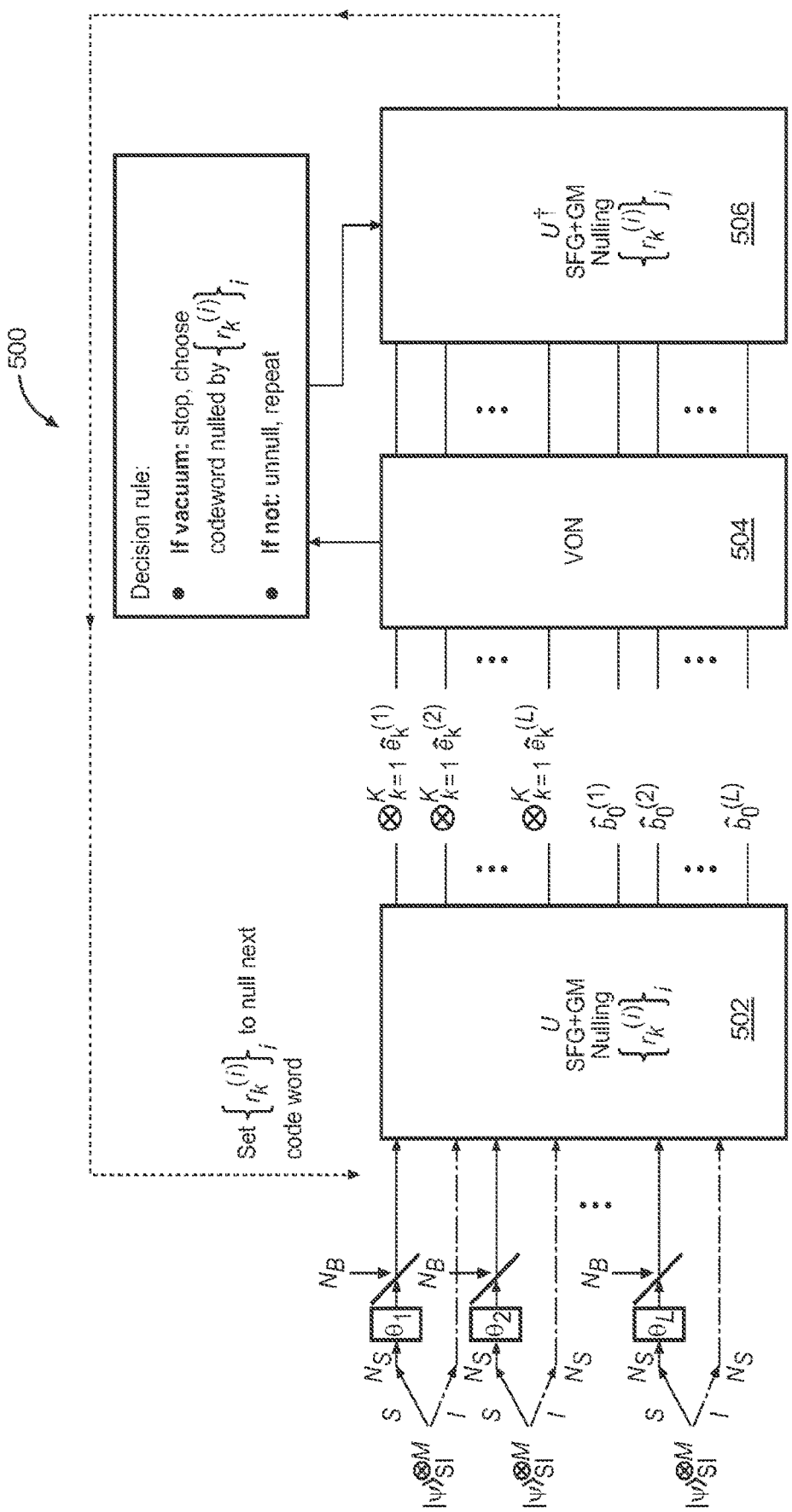
FIG. 5A is a schematic diagram of an example communication system.

FIG. 5A shows an example communication system 500, which uses a sum-frequency-generation-based successive nulling receiver module 502 that may attain the Entanglement-Assisted Holevo-Werner Capacity. The transmitter portion of the system uses BPSK phase modulation with a code book that attains the unassisted Holevo capacity for coherent state modulation when used in conjunction with a successive nulling and a multi-mode vacuum-or-not (VON) module 504. The receiver portion of the system applies additional squeezing (via the squeezing operations performed before and after the SFG gates) to the already correlated signal idler mode pairs in order to implement a successive nulling receiver. The additional squeezing enables information about the phase of the signal-idler correlation to be extracted from the noise modes as well. Every possible received codeword is successively nulled (to zero displacement on all modes $\hat{b}_0^{(l)}$) and detected with the VON module 504 coupled to an inverse receiver module 506 until the VON outcome is vacuum, at which point the receiver decides on the codeword matching the nulling pattern which produced the vacuum outcome.

Figure 5B:
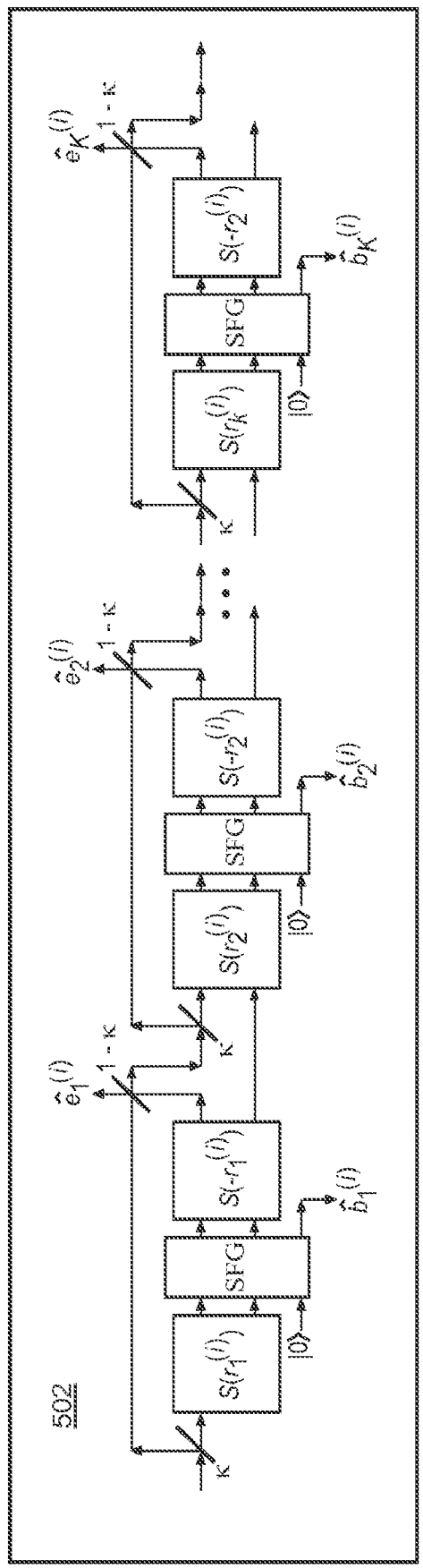
FIG. 5B is a schematic diagram of an example receiver module.

FIG. 5B shows an example implementation of the module 502. The SFG gates in the SFG modules are sandwiched by two-mode squeezing (TMS) gates to add/subtract correlation to the already correlated received signal and idler, analogous to displacing coherent states in the classical case. The squeezing parameters of the squeezers before and after each of the SFG gates in the SFG module artificially increases/decreases the amount of cross-correlation entering each SFG gate, and hence the amount of displacement on the sum-frequency mode. The TMS gates add dependence of the brightness of the noise-modes (labeled $e_k^{(i)}$ in FIG. 3 and FIG. 4) to the phase of the received signal-idler modes, so the vacuum-or-not measurement can act on the full output of the SFG module to potentially attain the Entanglement-Assisted capacity, which is unattainable with receivers that do not utilize the noise-modes $e_k^{(i)}$ when determining the phase of the correlation between the received signal and idler modes.

Referring again to FIG. 5A, the received codeword may be successively displaced with nulling set to individually null each codeword in the code book. For each nulling pattern, the received codeword may be detected with the multi-mode vacuum-or-not module 504 to determine if the received codeword matches the nulling pattern. If not, then the detected codeword is unnulled, and then nulled by the next pattern in the codebook, repeating the process. If the VON module 504 deems "vacuum", then the receiver can make its decision on the codeword whose pattern was used to null.

Figure 6B:
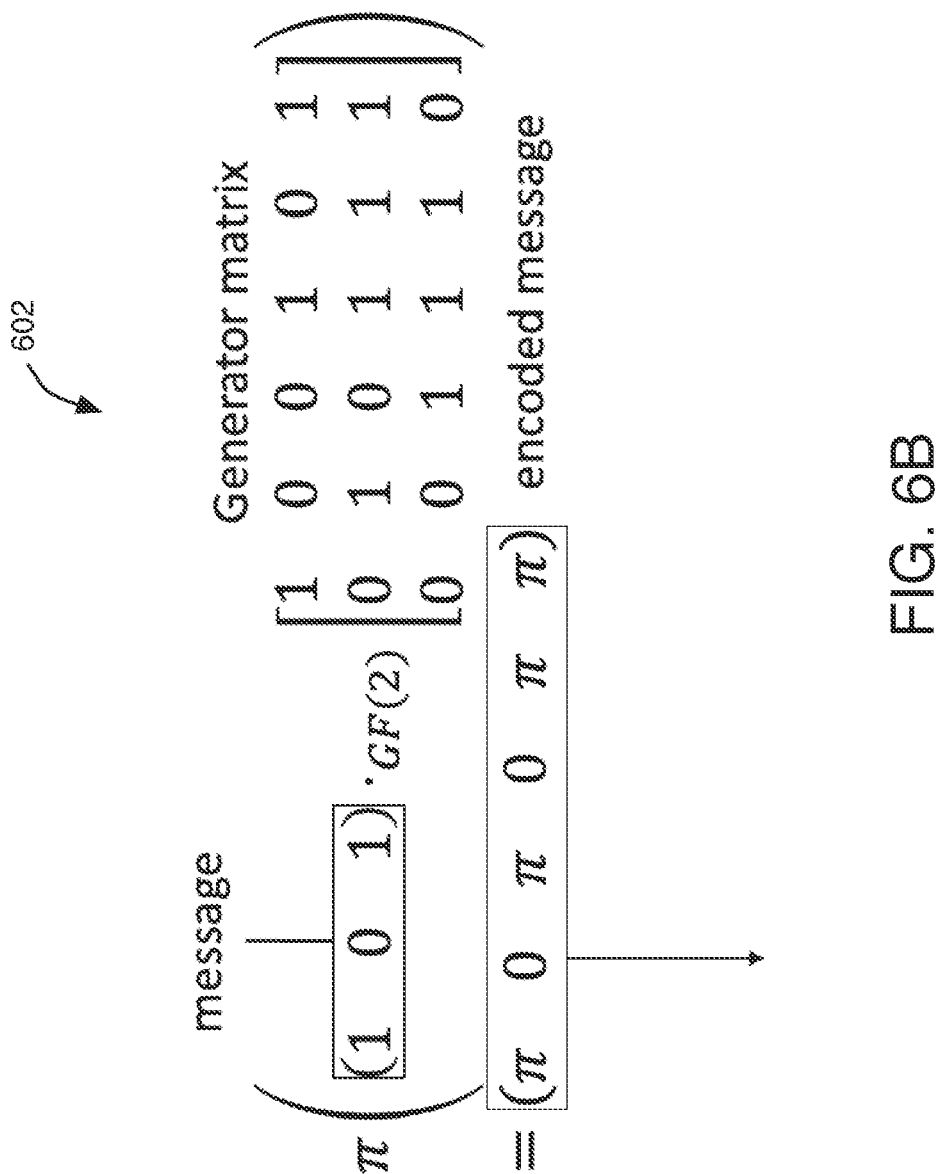
FIG. 6B is a schematic diagram of an example encoding scheme.

FIG. 6A shows a communication system 600 with a similar entanglement source 601, which uses a quantum processor 610 (e.g., a universal trapped ion quantum processor). Photon-Ion transduction stage 608 can also be used at the input of the quantum processor 610. Any classical Holevo capacity-attaining code (Turbo, Polar, LDPC, etc.) can be used to modulate entangled mode pairs, which may then be decoded with a universal quantum processor acting jointly on received signal-idler pairs. At the output of the quantum processor 610, a decision module 620 makes a decision to estimate a codeword that was used to modulate the phases. The system 600 may be able to attain the entanglement-assisted Holevo capacity by its universal nature. FIG. 6B shows an example of an encoding scheme that can be used for the encoder 602 of FIG. 6A.

The example communication systems described and shown herein include a set of entanglement sources that provide signal-idler pairs, which are transmitted and received by the respective transmitter and receiver portions of the communication systems. For conceptual clarity, entanglement sources show separate transmitting and receiving rows of modules for each signal-idler pair that corresponds to a particular symbol (1 to L). In some implementations, each row can represent a separate set of system modules. In other implementations, the same modules for transmitting and receiving a signal-idler pair can be reused for different signal-idler pairs, corresponding to different symbols, at different times. For example, a signal-idler pair can be operated on, with the resulting mode then stored (e.g., a fiber optic ring or qubit) while future signal-idler pairs are received and operated on by the same modules. Then, the stored modes can be combined as shown in the respective figures (e.g., sent to the mode combining module 310 (FIG. 3), the BPC 410 (FIG. 4), the VON module 504 (FIG. 5), or the quantum processor 610 (FIG. 6)). Additionally, although the example communication systems show many SFG modules, each SFG module could be reused, with its output modes sent back to its inputs, thus allowing for a reduction in the number of SFG modules.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for processing a stream of codewords, each codeword selected from a set of codewords, each codeword comprising a plurality of symbols associated with a symbol constellation, the method comprising:

receiving a set of encoded signals associated with a set of reference signals, where the set of encoded signals have been encoded with respective phases corresponding to symbols of a particular codeword of the stream, and where one or more of the set of encoded signals are each related to a corresponding one of the set of reference signals by quantum entanglement;

performing a first nonlinear optical process with inputs comprising a first signal derived from the set of encoded signals and a first signal derived from the set of reference signals;

performing a second nonlinear optical process with inputs comprising a second signal derived from the set of encoded signals and a signal derived from a first output of the first nonlinear optical process;

performing a first linear optical process with inputs comprising a signal derived from a second output of the first nonlinear optical process and a signal derived from a first output of the second nonlinear optical process; and processing information that includes a set of signals derived from one or more outputs of the first linear optical process to generate an estimate of the particular codeword.

2. The method of claim 1, further comprising:

performing a third nonlinear optical process with inputs comprising a third signal derived from the set of encoded signals and a second signal derived from the set of reference signals;

performing a fourth nonlinear optical process with inputs comprising a fourth signal derived from the set of encoded signals and a signal derived from a first output of the third nonlinear optical process; and performing a second linear optical process with inputs comprising a signal derived from a second output of the third nonlinear optical process and a signal derived from a first output of the fourth nonlinear optical process.

3. The method of claim 2, further comprising performing a third linear optical process with inputs comprising a signal derived from the one or more outputs of the first linear optical process and a signal derived from one or more outputs of the second linear optical process.

4. The method of claim 3, wherein the set of signals being processed to generate an estimate of the particular codeword further comprises the signal derived from the one or more outputs of the second linear optical process and a set of signals derived from one or more outputs of the third linear optical process.

5. The method of claim 4, wherein one of the signals in the set of signals derived from the one or more outputs of the third linear optical process is a non-vacuum coherent state.

6. The method of claim 5, wherein the one or more outputs of the third linear optical process, excluding the signal in a non-vacuum coherent state, are in a vacuum state.

7. The method of claim 6, further comprising measuring the signal in a non-vacuum coherent state and the one or more signals in a vacuum state.

8. The method of claim 7, further comprising combining, with a beam splitter, a remaining portion of the non-vacuum coherent state, after measurement, with a local oscillator;

measuring one or more outputs of the beam splitter; and determining if the one or more outputs of the beam splitter are a non-vacuum coherent state or a vacuum state.

9. The method of claim 8, wherein the estimate of the particular codeword is generated based at least in part on an outcome of the determining.

10. The method of claim 1, wherein the first nonlinear optical process and the second nonlinear optical process are sum-frequency generation.

11. The method of claim 1, wherein the first linear optical process uses at least one beam splitter.

12. The method of claim 1, wherein the first signal derived from the set of encoded signals and the second signal derived from the set of encoded signals are each derived by using respective beam splitters to split the encoded signals.

13. The method of claim 12, wherein one or more transmissivities of the respective beam splitters are chosen such that the first signal derived from the set of encoded signals and the second signal derived from the set of encoded signals each contain a mean photon number less than ten.

14. The method claim 1, wherein the set of encoded signals are a set of encoded optical signals.

15. The method of claim 14, wherein receiving the set of encoded signals comprises converting a set of encoded radio frequency signals into the set of encoded optical signals.

16. The method of claim 1, further comprising storing the reference signals until the encoded signals have been received.

17. The method of claim 1, wherein the quantum entanglement is created by spontaneous parametric down-conversion.

18. A method for processing a stream of codewords, each codeword selected from a set of codewords, each codeword comprising a plurality of symbols associated with a symbol constellation, the method comprising:

receiving a set of optical reference signals associated with a set of radio frequency (rf) input signals, where one or more of the optical reference signals are each related to a corresponding one of the rf input signals by quantum entanglement;

storing the optical reference signals until the rf input signals have been received;

receiving the rf input signals, where the rf input signals have been encoded with respective phases corresponding to symbols of a particular codeword of the stream;

performing photon-to-qubit transduction on a plurality of the rf input signals to initialize a set of input qubits of a universal quantum processor;

performing photon-to-qubit transduction on a plurality of inputs derived from the stored optical reference signals to initialize a set of input qubits of the universal quantum processor; and executing a quantum circuit on the universal quantum processor to generate a set of estimated symbols for estimating the particular codeword.

19. An apparatus for processing a stream of codewords, each codeword selected from a set of codewords, each codeword comprising a plurality of symbols associated with a symbol constellation, the apparatus comprising:

a reference module providing a set of reference signals; and a processing module configured to process the stream of codewords based on the reference signals, the processing comprising:

receiving a set of encoded signals associated with the set of reference signals, where the set of encoded signals have been encoded with respective phases corresponding to symbols of a particular codeword of the stream, and where one or more of the set of encoded signals are each related to a corresponding one of the set of reference signals by quantum entanglement;

performing a first nonlinear optical process with inputs comprising a first signal derived from the set of encoded signals and a first signal derived from the set of reference signals;

performing a second nonlinear optical process with inputs comprising a second signal derived from the set of encoded signals and a signal derived from a first output of the first nonlinear optical process;

performing a first linear optical process with inputs comprising a signal derived from a second output of the first nonlinear optical process and a signal derived from a first output of the second nonlinear optical process; and processing information that includes a set of signals derived from one or more outputs of the first linear optical process to generate an estimate of the particular codeword.

20. An apparatus for processing a stream of codewords, each codeword selected from a set of codewords, each codeword comprising a plurality of symbols associated with a symbol constellation, the apparatus comprising:

a reference module providing a set of optical reference signals; and a processing module configured to process the stream of codewords based on the optical reference signals, the processing comprising:

receiving the set of optical reference signals associated with a set of radio frequency (rf) input signals, where one or more of the optical reference signals are each related to a corresponding one of the rf input signals by quantum entanglement;

storing the optical reference signals until the rf input signals have been received;

receiving the rf input signals, where the rf input signals have been encoded with respective phases corresponding to symbols of a particular codeword of the stream;

performing photon-to-qubit transduction on a plurality of the rf input signals to initialize a set of input qubits of a universal quantum processor;

performing photon-to-qubit transduction on a plurality of inputs derived form the stored optical reference signals to initialize a set of input qubits of the universal quantum processor; and executing a quantum circuit on the universal quantum processor to generate a set of estimated symbols for estimating the particular codeword.

* * * * *